July 3, 1923.

H. SELKER 1,460,515

BEARING AND METHOD OF MAKING SAME

Filed Sept. 29, 1921    3 Sheets-Sheet 1

INVENTOR:
HARRY SELKER
BY George W. Taywell
ATTORNEY

INVENTOR:
HARRY SELKER
BY George W. Saywell
ATTORNEY

July 3, 1923.

H. SELKER 1,460,515

BEARING AND METHOD OF MAKING SAME

Filed Sept. 29, 1921     3 Sheets-Sheet 3

INVENTOR:
HARRY SELKER

BY George W. Jaywell
ATTORNEY

Patented July 3, 1923.

1,460,515

UNITED STATES PATENT OFFICE.

HARRY SELKER, OF CLEVELAND, OHIO, ASSIGNOR TO THE BUCKEYE BRASS AND MANUFACTURING COMPANY, OF CLEVELAND, OHIO, A CORPORATION OF OHIO.

BEARING AND METHOD OF MAKING SAME.

Application filed September 29, 1921. Serial No. 504,147.

*To all whom it may concern:*

Be it known that I, HARRY SELKER, a citizen of the United States, resident of Cleveland, county of Cuyahoga, and State of Ohio, have invented new and useful Improvements in Bearings and Methods of Making Same, of which the following is a specification, the principle of the invention being herein explained and the best mode in which I have contemplated applying that principle, so as to distinguish it from other inventions.

My invention relates to bearings and particularly to devices of this character having a relatively soft non-ferrous coating serving as a wearing surface and requiring extraneous lubrication, such as a babbitt wearing surface, as distinguished from bearings having a graphite or other so-called antifriction or self-lubricating wearing surface. This new and improved bearing has a main body portion or support for the wearing coat, comprised of different material and forming a strengthening member. My invention also relates to a new and improved method of manufacturing bearings.

The annexed drawings and the following description set forth in detail certain means embodying my invention and certain steps covering my new method, the disclosed means and steps, however, constituting but one of the various mechanical forms in which the principle of the invention may be applied and by which the same may be carried out.

Figure 11:
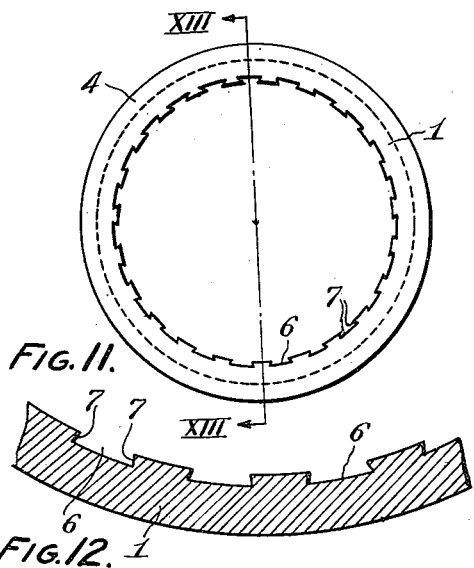
Figure 11 represents an end view of a cylindrical tubular blank, which has been produced by any well-known method, preparatory to the locating upon the inner surface thereof of a babbitt coating by the improved method of making my new bearing.
Figure 13:
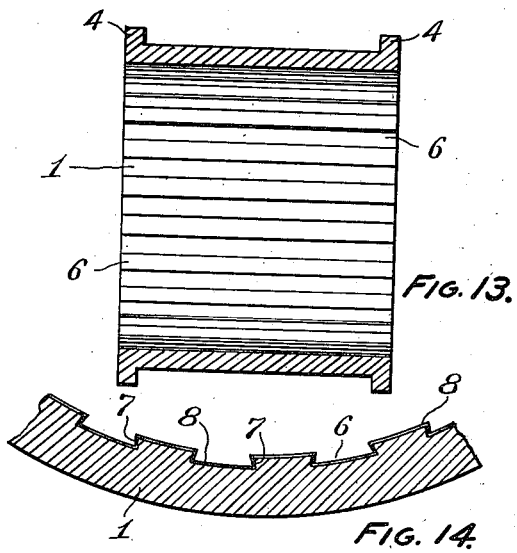
Figure 13 represents a longitudinal section, taken in the plane indicated by the line XIII—XIII, Figure 11.
Figure 21:
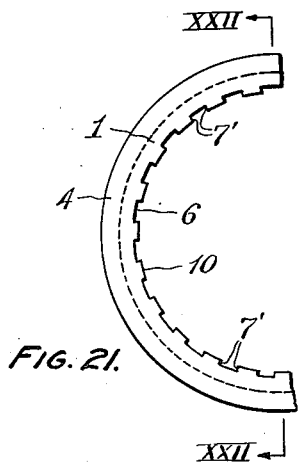
Figure 22:
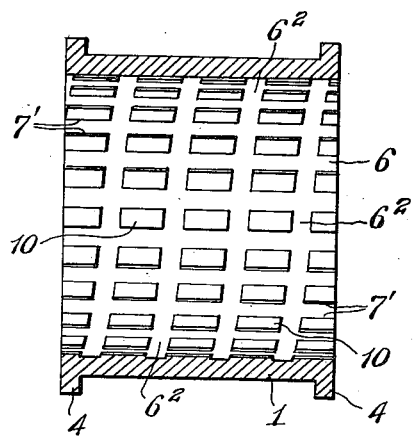
Figure 19:
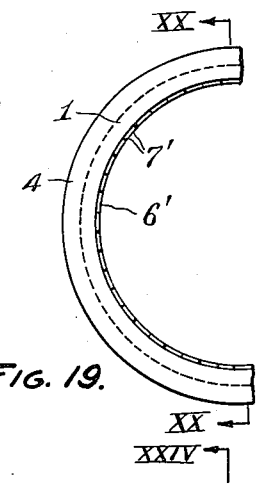
Figure 20:
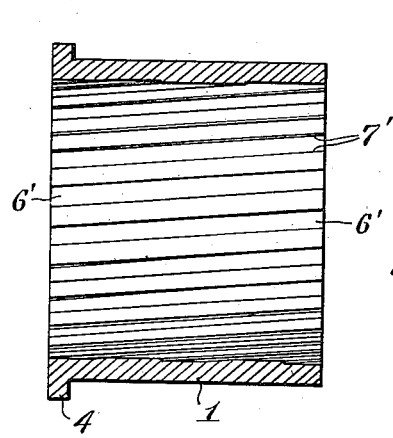
Figure 23:
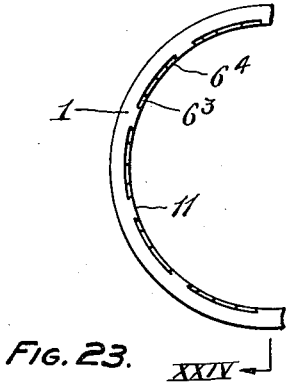
Figure 24:
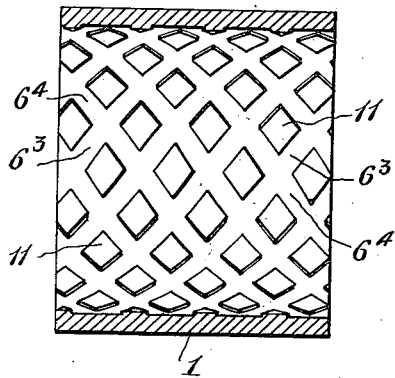

Figures 19 and 20 are views similar to Figures 11 and 13, showing a modified arrangement of grooves or slots in that the same are inclined to the axis of the bearing; furthermore, the opposing side walls of the slots in these figures lie in substantially parallel planes instead of diverging outwardly, as shown in Figures 11 and 13; Figures 21 and 22 are views similar to Figures 11 and 13 of a further modified arrangement of slots in that a series of substantially longitudinal slots are crossed by a transverse series of helical grooves or slots, opposing side walls of these slots also lying in substantially parallel planes; and Figures 23 and 24 are views, similar to Figures 11 and 13, of a third modified arrangement of slots in which two series of slots cross each other, one series consisting of a plurality of right-hand helical grooves or slots and the other series consisting of a plurality of left-hand helical grooves or slots.

My improved bearing is not designed as an anti-friction bearing, it being granted that the use of extraneous lubricant is necessary. The bearing is designed largely for use with hydrocarbon engines and lubricant is essential for that field of bearings in any event.

Figure 1:
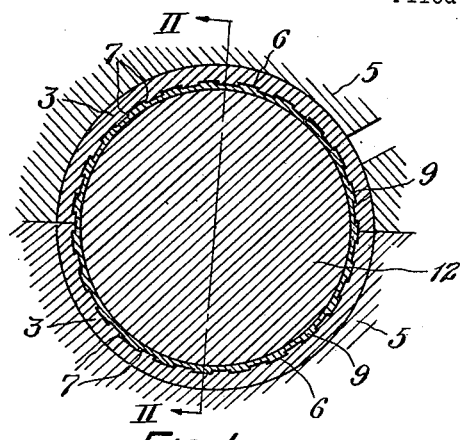
Figure 1 represents a transverse section, taken in the plane indicated by the line I—I, Figure 2, showing one form of my improved bearing in combination with associated shaft and housing elements.
Figure 2:
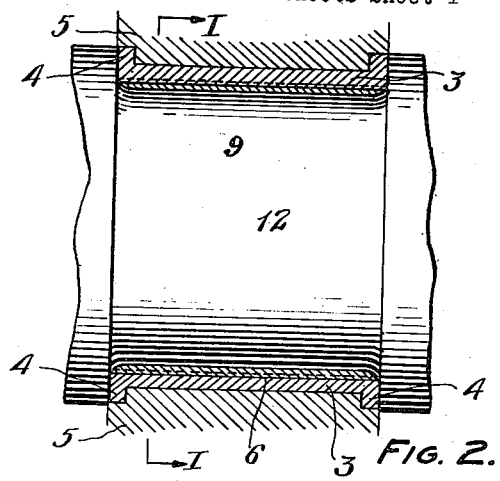
Figure 2 represents a longitudinal section, taken in the plane indicated by the line II—II, Figure 1.
Figure 3:
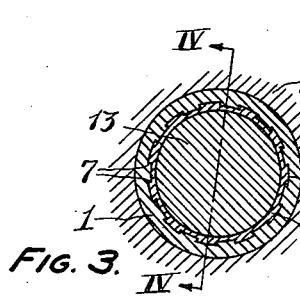
Figure 3 represents a transverse section of another form of bearing, taken in the plane indicated by the line III—III, Figure 4, showing this form of bearing in combination with associated shaft and housing elements.
Figure 4:
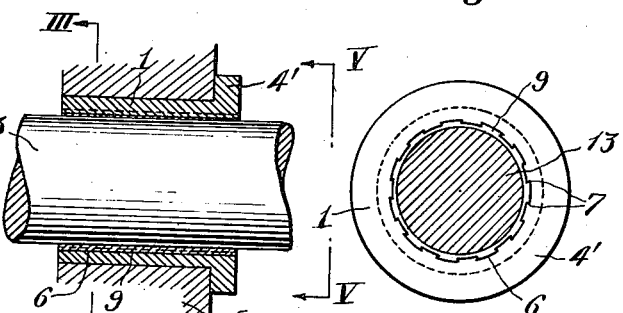
Figure 4 represents a longitudinal section, taken in the plane indicated by the line IV—IV, Figure 3.
Figure 5:
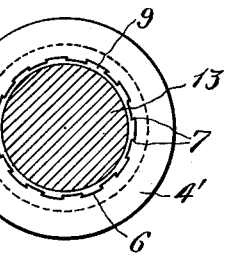
Figure 5 represents an end view, taken from the plane indicated by the line V—V, Figure 4.
Figure 6:
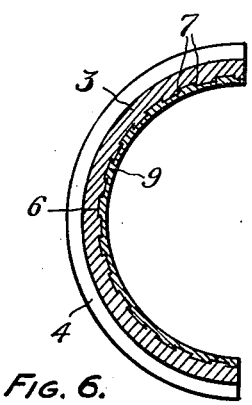
Figure 6 represents a transverse section, taken in the plane indicated by the line VI—VI, Figure 7, of one of the halves of a two-piece bearing.
Figure 7:
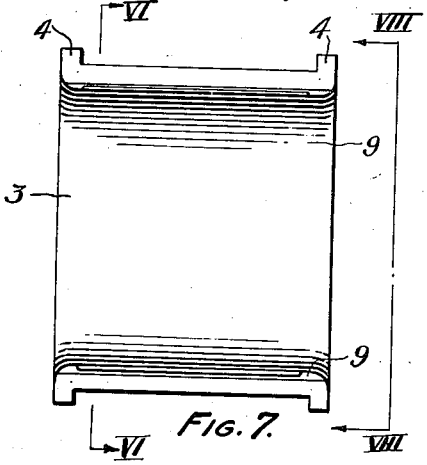
Figure 7 represents a plan view of said half of the bearing.
Figure 8:
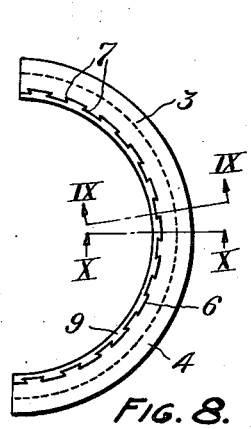
Figure 8 represents an end view, taken from the plane indicated by the line VIII—VIII, Figure 7.
Figure 9:
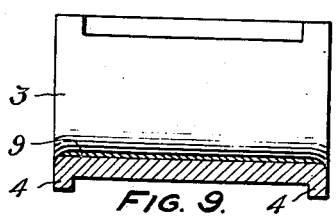
Figures 9 and 10 represent longitudinal sections, taken in the planes indicated by the respective lines IX—IX and X—X, Figure 8.
Figure 10:
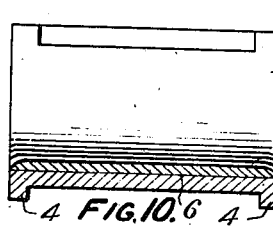

Referring to the annexed drawings in which the same parts are indicated by the same respective ordinals in the several views, 1 represents a cylindrical tubular blank which has been produced in any suitable manner, such as casting and machining, the same forming the body portion of my improved bearing in solid form, a one-half bearing member being indicated by the ordinal 3, Figures 6 to 10, when the bearing is produced by halves. These members 1 and 3 are formed with the flanges 4 by means of which they are positioned in the housing 5, Figure 2, when the bearing is used as shown in said figure; for instance, a bearing for a crank shaft 12. In the form of bearing shown in Figure 4, a form to accommodate a cam shaft 13, for instance, the blank 1 is formed with one flange 4', instead of two flanges 4, for positioning the bearing.

Figure 12:
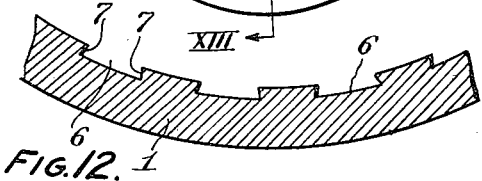
Figure 12 represents, upon an enlarged scale, a fragmentary transverse section of the elements shown in Figure 11.
Figure 14:
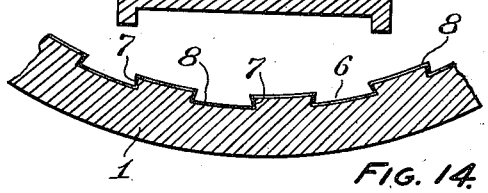
Figure 14 represents a section similar to Figure 12, showing in addition a layer of amalgamating material, such as solder, applied to the inner surface of the tubular blank.
Figure 16:
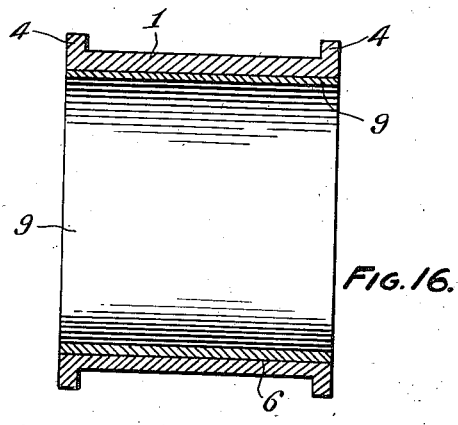
Figure 16 represents a longitudinal section, taken in the plane indicated by the line XVI—XVI, Figure 15.
Figure 17:
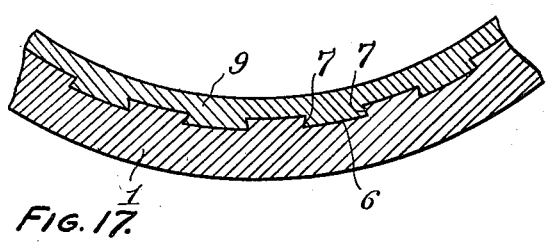
Figure 17 represents, upon an enlarged scale, a fragmentary transverse section of the elements shown in Figure 15.
Figure 18:
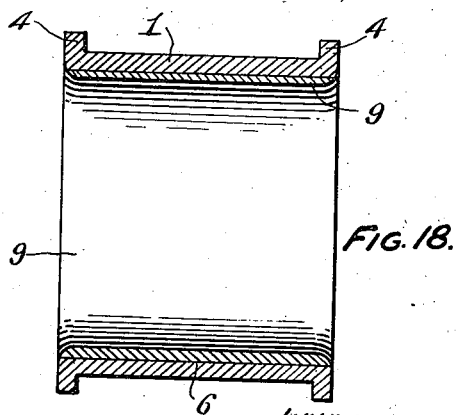
Figure 18 is a longitudinal section, similar to Figure 16, but showing, furthermore, the bearing machined to a finished form.

I form suitable slots in the inner surface of the body member 1 by means of which a soft non-ferrous coating to form a wearing surface may be secured to the body member in such a manner as positively to prevent displacement of the wearing coat with relation to the body member. These slots may have outwardly-divergent walls so that the coating units, preferably babbitt, which fill the slots, are wedge-shaped in cross-section and thus form keys for anchoring the babbitt. These slots may be formed in any approved manner, viz, by sand casting, die-casting, forging, extruding, shaping, broaching etc., and the slots may take any desired suitable form, preferably the form of substantially longitudinal grooves 6, having outwardly-diverging side walls 7, Figures 11 and 12. However, I do not find it necessary in order to secure the babbitt (hereinafter more fully described) to the inner surface of the strengthening member 1, either to form the slots or grooves 6 with outwardly-diverging side walls 7 or to provide substantially longitudinal continuous grooves 6, but I form, for certain purposes, slots having substantially parallel side walls 7', as shown in Figures 19 and 21; and, for certain purposes, also form slots or grooves in planes inclined to the axis of the bearing, as shown by 6', Figures 19 and 20; or compound the longitudinal grooves 6 with a series of helical grooves $6^2$, as shown in Figure 22, thus forming a plurality of inwardly extending projections 10; or interlace a series of right-hand helical grooves $6^3$ with a series of left-hand helical grooves $6^4$, forming a plurality of inwardly extending projections 11, as shown in Figure 24. I then cleanse the formed blank 1 with acid, or in any other suitable way, or flux the same, after which I cover the inner surface with a material suitable for amalgamating said surface with the babbitt, and I have illustrated such a material by a thin layer of solder 8, Figure 14, this layer being therein shown of exaggerated thickness. The babbitt 9 is to be attached to the surface treated, as above described, with the amalgamating material. This babbitt is applied by any well-known method of pouring or casting babbitt. After the babbitt 9 has set, the bearing formed with the babbitt wearing surface 9, as shown in Figure 16, may be finally machined to a suitable finished form, as shown in Figure 18, if any machining is necessary, depending upon the degree of accuracy required for the use to which the bearing is to be subjected.

I wish particularly to point out several reasonable observations concerning the strength and efficiency of my improved bearing and some of the differences distinguishing the same from a so-called anti-friction bearing, for instance, a graphite bearing. The metallic shell or support 1 which I provide, preferably a non-ferrous support, such as brass, strengthens the babbitt so that the same, due to its adherence to the support and its anchorage, will not become displaced during assembling, handling or transporting, or be pounded out in service. The metallic support also provides a good conductor for conveying the heat from the bearing. On the other hand, the babbitt coating provides a soft wearing surface which will not readily score the shaft or other element moving swiftly over the bearing surface. Finally, the brass and babbitt, by the aid of the amalgamating material, such as solder, firmly and closely adhere one to the other. As regards the so-called anti-friction bearings, the same do not allow a bearing pressure for the same area equivalent to that allowed by my babbitt bearing. Also, the so-called anti-friction material, such as graphite, which is applied in paste form, as distinguished from my pouring operation, disintegrates and is pounded out under a hammering load so that it squeezes out from the ends of the bearing. Furthermore, in any use of an anti-friction bearing in a hydrocarbon engine, where my improved bearing probably finds its best application, the anti-friction material, which would there require extraneous lubricant also, is washed longitudinally out by reason of the rotating shaft and by reason of the oil stream.

By reason of the fact that the outwardly diverging keyways 6 are disposed longitudinally of the bearing, the babbitt liner is prevented from rotating with the shaft because, of course, when in service, the outer supporting brass shell 1 is rigidly secured. It is well known that when the babbitt becomes heated, it does not melt out immediately, but, due to the great affinity which it possesses for a clean steel surface, it tends to stick to the rotating shaft. As stated, my longitudinal keyways obviate this difficulty. Furthermore, the outer supporting part 1 of my improved bearing is a removable bearing shell and not an integral portion of the main frame or bed in which the bearing is located. The solder or amalgamating material 8 prevents the loosening up of the babbitt from the brass shell by the pounding to which the bearing is subjected.

Figure 15:
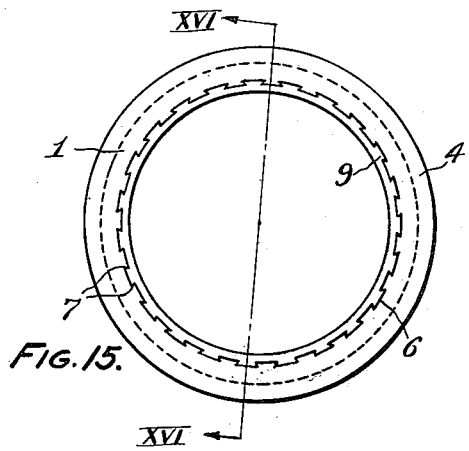
Figure 15 represents an end view of the tubular member after the same has been treated with amalgamating material and a babbitt coating has been located upon the inner surface thereof and amalgamated therewith by means of the amalgamating material.

I wish also particularly to point out that the key-ways 6 and the intermediate alternate projections, which are of substantially an equal width to said key-ways, are comparatively narrow, there being a great number of said projections and key-ways in a single bearing, as plainly shown in Figure 15, the result being that I place my reliance for a secure transverse union between the support and the liner upon these keys and key-ways. If these key-ways are widely spaced, then a considerable portion of the liner is unattached except for the reliance upon the amalgamated material. As stated above, I utilize the amalgamating material to serve to prevent the loosening up of the liner by the pounding to which the bearing is subjected, and not primarily to prevent the liner from turning with the rotating shaft. This last mentioned result I secure effectively by my construction of interlocked keys and key-ways.

The bearing shown in Figure 15 illustrates substantially a 2-inch bearing. It will be noted that the same contains 23 key-ways 6 and 23 alternate keys. This means that each key and each key-way is substantially $\frac{1}{8}$-inch in width. Some latitude in width of these keys and key-ways is allowable for effecting the improvements of my invention, but I have found that this width should be within the limits of $\frac{1}{8}$ to $\frac{3}{16}$-inch.

What I claim is:

1. A method of manufacturing bearings consisting in, preparing the inner surface of a shell-like metallic supporting member for receiving and retaining a babbitt coating, by forming longitudinal slots therein, and covering with amalgamating material; and, then, locating the babbitt.

2. A method of manufacturing bearings consisting in, preparing the inner surface of a shell-like metallic supporting member for receiving and retaining a babbitt coating, by forming substantially longitudinal slots therein having outwardly-diverging walls, and covering with an amalgamating material; and, then, pouring the babbitt upon the said surface.

3. A method of manufacturing bearings consisting in, preparing the inner surface of a shell-like brass supporting member for receiving and retaining a babbitt coating, by forming therein longitudinal keyways and covering with an amalgamating material, and, then pouring the babbitt upon said surface.

4. A removable bearing comprising, an annular brass member having longitudinal alternate non-parallel-sided keys and keyways in its inner surface, said keys and key-ways being substantially of equal width and each being comparatively narrow, and said key-ways having outwardly diverging walls; a babbitt coating for said member, said coating filling said key-ways and covering said keys; and amalgamating material securing together said brass and babbitt.

Signed by me this 20th day of September, 1921.

HARRY SELKER.